(12) United States Patent
Moon et al.

(10) Patent No.: US 8,983,944 B2
(45) Date of Patent: Mar. 17, 2015

(54) METHOD OF PROVIDING INFORMATION OF MAIN KNOWLEDGE STREAM AND APPARATUS FOR PROVIDING INFORMATION OF MAIN KNOWLEDGE STREAM

(71) Applicant: Korea Institute of Science and Technology Information, Daejeon (KR)

(72) Inventors: Young Ho Moon, Seoul (KR); Kang Hoe Kim, Seoul (KR); Seon Ho Kim, Seoul (KR); Woon Dong Yeo, Seoul (KR); Jae Woo Kang, Seoul (KR); Jae Min Lee, Hwaseong (KR)

(73) Assignee: Korea Instititute of Science and Technology Information, Daejeon (KR)

( * ) Notice: Subject to any disclaimer, the term of this patent is extended or adjusted under 35 U.S.C. 154(b) by 133 days.

(21) Appl. No.: 13/726,220

(22) Filed: Dec. 24, 2012

(65) Prior Publication Data

US 2014/0101173 A1      Apr. 10, 2014

(30) Foreign Application Priority Data

Oct. 8, 2012    (KR) .......................... 10-2012-0111318

(51) Int. Cl.
 *G06F 17/30*      (2006.01)
 *G06F 17/22*      (2006.01)
(52) U.S. Cl.
 CPC ...... *G06F 17/2235* (2013.01); *G06F 17/30014* (2013.01)
 USPC ......................................................... 707/726

(58) Field of Classification Search
 USPC ......................................................... 707/726
 See application file for complete search history.

(56) References Cited

U.S. PATENT DOCUMENTS

| | | | | |
|---|---|---|---|---|
| 6,289,488 | B1 * | 9/2001 | Dave et al. ..................... | 716/105 |
| 8,600,968 | B2 * | 12/2013 | Holenstein et al. ........... | 707/706 |
| 8,625,424 | B2 * | 1/2014 | Jaeger ........................... | 370/231 |
| 8,630,975 | B1 * | 1/2014 | Guo et al. ...................... | 707/608 |
| 2006/0155751 | A1 * | 7/2006 | Geshwind et al. ............ | 707/102 |
| 2007/0208719 | A1 * | 9/2007 | Tran ................................. | 707/3 |
| 2009/0132901 | A1 * | 5/2009 | Zhu et al. ...................... | 715/206 |
| 2009/0157572 | A1 * | 6/2009 | Chidlovskii .................... | 706/12 |
| 2013/0138428 | A1 * | 5/2013 | Chandramouli et al. ......... | 704/9 |
| 2013/0246439 | A1 * | 9/2013 | Liekens et al. ................ | 707/748 |

* cited by examiner

*Primary Examiner* — Cam-Linh Nguyen
(74) *Attorney, Agent, or Firm* — Park, Kim & Suh, LLC

(57) ABSTRACT

A method for providing information about a main knowledge stream is disclosed. According to an embodiment of the present invention, the method includes obtaining reference links representing reference relationships among reference documents in each of a plurality of documents stored in a database, determining one or more basic paths connecting the reference links, calculating probability values of the reference links by overlapping the determined basic paths, determining a first document among the documents and an input reference link associated with the first document, and performing a Markov chain model using a probability value of the input reference link, and calculating information about the main knowledge stream associated with the first document using the result obtained by performing the Markov chain model.

13 Claims, 9 Drawing Sheets

FIG. 1

| Field | Numbers of articles | Referenced number of times | Average referenced numbers of times per article |
|---|---|---|---|
| Field A | 2 | 4 | 2 |
| Field B | 3 | 9 | 3 |
| Field C | 5 | 20 | 4 |
| Total | 10 | 33 | |

METHOD OF PROVIDING INFORMATION OF MAIN KNOWLEDGE STREAM AND APPARATUS FOR PROVIDING INFORMATION OF MAIN KNOWLEDGE STREAM

This application claims the priority benefit of Korean Application No. 10-2012-0111318, field on Oct. 8, 2012, which is hereby incorporated by reference as if fully set forth therein.

BACKGROUND OF THE INVENTION

1. Field of the Invention

The present invention relates to a method for providing information about a main knowledge stream and an apparatus for providing information about a main knowledge stream.

2. Discussion of the Related Art

In order to figure out an information stream or a knowledge stream related to a field of study, schemes using the numbers of times that articles have been referenced for figuring out the main stream thereof have been developed. Conventionally, a scheme for figuring out a knowledge stream of a specific field of study is achieved by searching for articles which were referenced many times. Referring to FIG. 1, conventional scheme for searching for and providing with a main knowledge stream of a specific study will be described.

FIG. 1 is a table for illustrating a scheme used for providing a main knowledge stream. For example, it is assumed that a technical field may be divided into three particular technical fields A, B and C, each of which has 2, 3, and 5 articles, respectively. If the articles in each of the particular technical fields A, B and C were referenced 4, 9, and 20 times, respectively, the average referenced numbers of times per article in each of the particular technical field was referenced are 2, 3, and 4, respectively.

The total number of the articles in all of the three particular technical fields is ten, and the total number of times that all of the articles were referenced is thirty-three. In a local point of view which considers particular technical fields, the average referenced number of times per article in the technical field is (2+3+4)/3 (the number that the sum of the average referenced numbers of times per article in each of the particular technical fields is divided by the number of the particular technical fields). On the other hand, in a global point of view which does not consider particular technical fields, the referenced number of time per article in the technical field is 33/10 (the number that the sum of numbers of times that the articles were referenced is divided by the number of the articles). Accordingly, the number of times that an article was referenced may differ depending on which particular technical field is considered, for example. That is, if a document is related to several technical fields, knowledge streams in each of the technical fields may not be figured out simply by using the number of times that articles were referenced as basis data for providing knowledge streams.

As schemes for determining a knowledge stream, a node pair projection count (NPPC) method, a search path link count (SPLC) method, and a search path node pair (SPNP) method have been discussed. However, these schemes for figuring out a main knowledge stream, in a statistical manner or quantitative information analysis manner such as summing the numbers of times that documents were referenced, have the following problems.

First, when information included in a document covers various fields, it may not be possible to identify from which technical field the document has acquired a main knowledge stream, among several technical fields, and from which document in the technical field. Therefore, for a document covering various fields, conventional schemes for figuring out a main knowledge stream may not be possible to provided accurate information about the main knowledge stream.

Since a document may relate to researches in several fields, a main knowledge stream may not be figured out only by focusing on such statistical schemes, without considering technical fields of reference documents and understanding knowledge streams in each of technical fields.

Accordingly, there is a problem in that the knowledge stream the author of a document considers may not match the knowledge stream according to a simple statistical scheme as described above.

SUMMARY OF THE INVENTION

Accordingly, the present invention is directed to a method for providing information about a main knowledge stream and an apparatus for providing information about a main knowledge stream that substantially obviate one or more problems due to limitations and disadvantages of the related art.

An object of the present invention is to provide a method for providing information about a main knowledge stream and an apparatus for providing information about a main knowledge stream that are able to more accurately provide a main knowledge stream based on technical field to which documents belong, ways of solution, etc.

Another object of the present invention is to provide a method for providing information about a main knowledge stream and an apparatus for providing information about a main knowledge stream in which knowledge streams of documents may be accurately estimated even if reference documents referenced by authors of the documents belong to different technical fields.

Another object of the present invention is to provide a method for providing information about a main knowledge stream and an apparatus for providing information about a main knowledge stream that are able to figure out a main knowledge stream by exactly estimating a knowledge stream an author actually followed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for providing information about a main knowledge stream includes obtaining reference links representing reference relationships among reference documents in each of a plurality of documents stored in a database, determining one or more basic paths connecting the reference links, calculating probability values of the reference links by overlapping the determined basic paths, determining a first document among the documents and an input reference link associated with the first document, and performing a Markov chain model using a probability value of the input reference link, and calculating information about the main knowledge stream associated with the first document using the result obtained by performing the Markov chain model.

The calculating may include determining an output reference link associated with the first document based on the probability value of the input reference link using the Markov chain model.

The method may further include calculating an output reference link using the Markov chain model for a second document having the output reference link as an input reference link, and connecting the calculated reference links to provide information about a main knowledge stream.

The input reference link may represent a reference relationship with a third document referenced by the first document. The output reference link may represent a reference relationship that the second document references the first document.

In another aspect of the present invention, a method for providing information about a main knowledge stream includes obtaining reference links representing reference relationships among reference documents in each of a plurality of documents stored in a database, determining one or more basic paths connecting the reference links, calculating accumulated values of the reference links by overlapping the determined basic paths, calculating information about the main knowledge stream associated with the first document using a first document among the documents and the accumulated values of the reference link associated with the first document.

In another aspect of the present invention, an apparatus for providing information about a main knowledge stream includes a storage unit for storing information about a plurality of documents, an information process unit for obtaining reference links representing reference relationships among reference documents in each of the documents from information about the documents stored in the storage unit, determining one or more basic paths connecting the reference links, calculating probability values of the reference links by overlapping the determined basic paths, determining a first document from among the documents and an input reference link associated with the first document, performing a Markov chain model using a probability value of the input reference link, and calculating information about a main knowledge stream associated with the first document using the result obtained by performing the Markov chain model, and an output unit for providing information about the main knowledge stream associated with the first document calculated by the information process unit.

The information process unit may determine an output reference link associated with the first document based on the probability value of the input reference link using the Markov chain model, calculate an output reference link using the Markov chain model for a second document having the output reference link as an input reference link; and connect the calculated reference links to provide information about a main knowledge stream.

In another aspect of the present invention, a storage medium for providing information about a main knowledge stream stores a program configured to obtain reference links representing reference relationships among reference documents in each of a plurality of documents stored in a database, determine one or more basic paths connecting the reference links, calculate probability values of the reference links by overlapping the determined basic paths, determine a first document among the documents and an input reference link associated with the first document, perform a Markov chain model using a probability value of the input reference link, and calculate information about the main knowledge stream associated with the first document using the result obtained by performing the Markov chain model.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a table for illustrating a scheme used for providing a main knowledge stream;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

An embodiment of the present invention will be described below in detail with reference to the accompanying drawings.

Herein, a document is a general term for a paper, a record and an electronic file which contain information. An author of an information document references information which is important for a study in one form or another. Hereinafter, a reference document includes both of a document which has been referenced for writing a document and a document the author acknowledged he has referenced. Since each of reference documents also has its reference documents, reference relationships between documents may be established.

Figure 2:
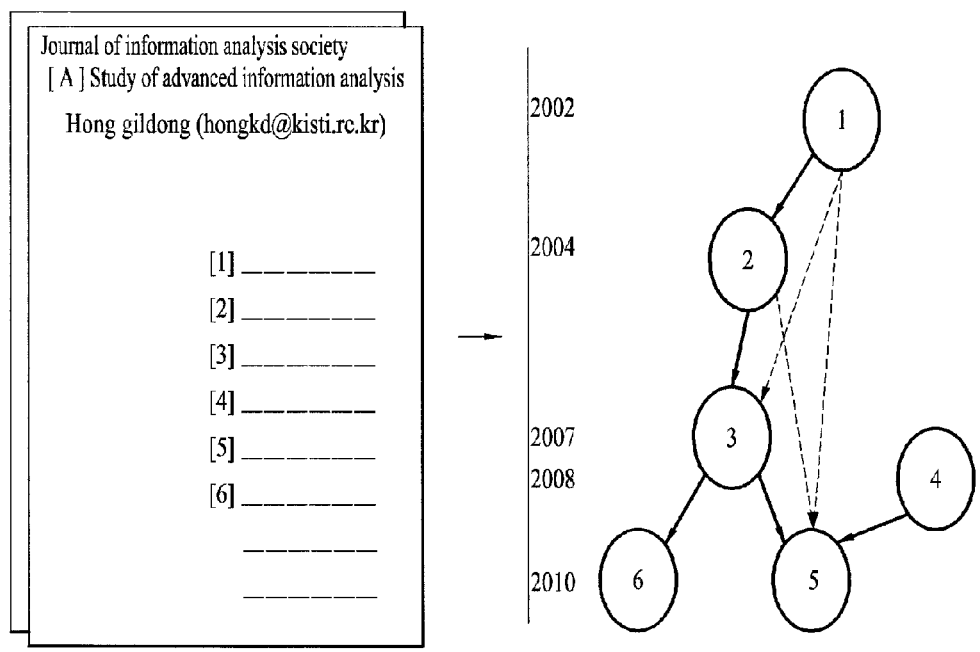
FIG. 2 is a view showing reference relationships for illustrating an embodiment of the present invention.

FIG. 2 shows an example of reference relationships for illustrating an embodiment of the present invention.

At the left side of the drawing, a document A (title: a Study for Advanced Information Analysis) is shown which references documents 1 to 6 as cited documents or reference documents.

At the right side of the drawing, the reference documents of the document A are shown in circles with identification numbers. The arrows indicate knowledge streams using reference relationships among documents. A document in a circle from which an arrow originates has influence on a document in a circle the arrow reaches. Such knowledge streams may be found by reversely going up the reference relationships between the documents.

It is assumed that the numbers indicated in the left side are years when documents are issued or published. In this example, the document 1 was issued in 2002, the document 2 was issued in 2004, the document 3 was issued in 2007, the document 4 was issued in 2008, and the documents 5 and 6 were issued in 2010.

A direction of an arrow represents a direction of a knowledge stream, while a reverse direction of an arrow represents a reference relationship of a document. Based on the relationships of the arrows shown, it is assumed that the document 1 was referenced in the document 2, the document 3 and the document 5, the document 2 was referenced in the document 5, the document 3 was referenced in the document 5, and the document 4 was referenced in the document 5.

With the above reference relationships, the document 5 may be said to be influenced by the document 1, the document 2, the document 3, and the document 4. Accordingly, it may be determined that information in the document 5 came from information or knowledge in the document 1, the document 2, the document 3, and the document 4. According to the embodiment of the present invention, it may be possible to determine which one of such information streams and knowledge streams is a main knowledge stream.

Figure 3:
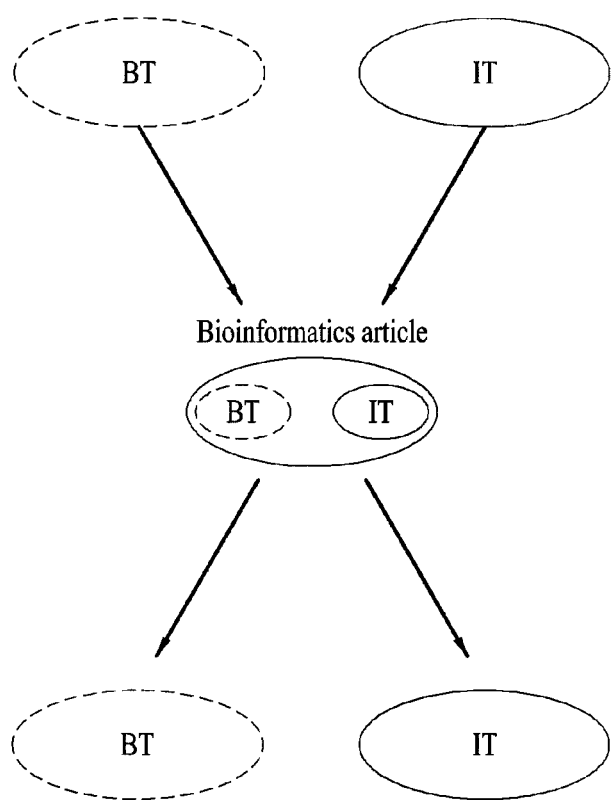
FIG. 3 is a view showing a main knowledge stream of a technical field for illustrating the embodiment of the present invention.

FIG. 3 shows an example of a main knowledge stream in a technical field for illustrating the embodiment of the present invention. A main knowledge stream in a technical field is described with reference to FIG. 3 as follows. Bioinformatics is to effectively arrange and analyze information in the biological field and includes the biology field and the information field. For example, articles in the bioinformatics field may be written with technologies and principles in both biotechnology (BT) and information technology (IT). Accordingly, a document referenced in articles in bioinformatics may be a document in biotechnology (BT) or in information technology (IT).

Further, if the document in bioinformatics references another document, it may reference a document in the biotechnology field (BT) or information technology (IT). In searching for information about a main knowledge stream information, since knowledge streams in the biotechnology field are quite different from those of the information technology field, information about a main knowledge stream may differ depending on which technical fields is to be searched. That is, in determining a main knowledge stream for a document in bioinformatics, the main knowledge stream may differ depending on which technical field of the reference documents in the document in the bioinformatics.

An author of a document refers to a document which contributes to an important part in writing the document. Therefore, it may not be possible to accurately obtain information about a main knowledge stream if a main knowledge stream is obtained without reflecting differences in technical fields of reference documents.

In the example shown in this drawing in which a main knowledge stream lies in bioinformatics, one of two kinds of streams may be determined, i.e., a stream (indicated by dotted lines) in which a technology referenced in a biotechnology (BT) field document was referenced in another biotechnology field (BT) document and a stream (indicated by solid lines) in which a technology referenced in an information technology (IT) document was referenced in another information technology (IT) document.

According to the embodiment of the present invention, information about reference documents and reference relationships among the reference documents are stored, and it may be possible to determine information about a knowledge stream from the reference relationships among the stored, reference documents. With respect to a certain document, a main knowledge stream may be determined according to reference documents in the certain document.

For instance, when one of several knowledge streams passing through a certain document is determined based on reference relationships among documents, a main knowledge stream may differ depending on which reference relationship is selected from the reference documents of the certain document.

In the reference relationships in FIGS. 2 and 3, when a document is referred to as a node, a reference relationship is referred to as a reference link, and a series of several reference links is referred to as a path, according to the embodiment of the present invention, a main knowledge stream may be determined not by using nodes but by reference links input to the nodes.

Figure 4:
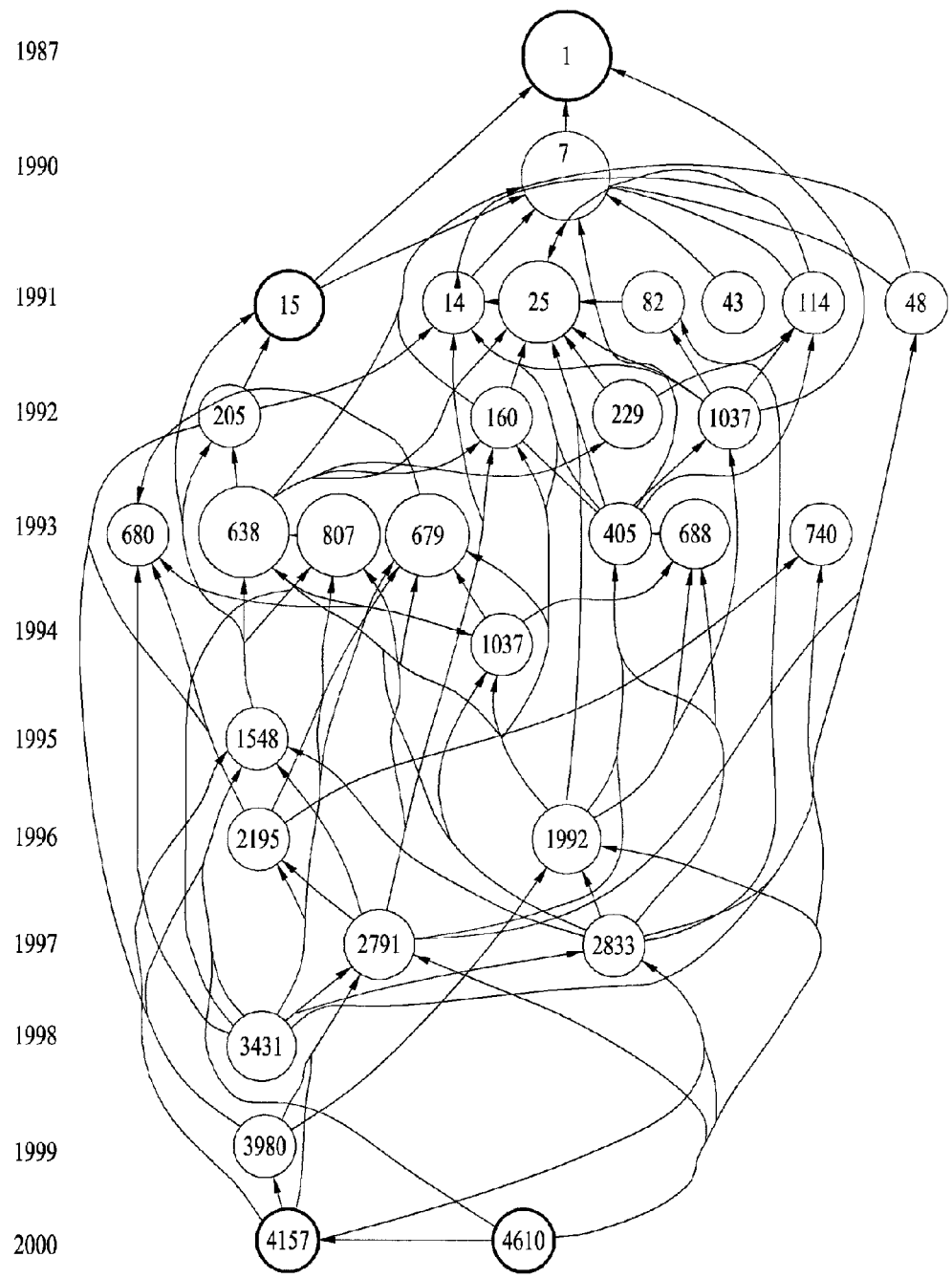
FIG. 4 is a view showing reference relationships among a plurality of reference documents used for calculating a main knowledge stream according to the embodiment of the present invention.

FIG. 4 illustrates reference relationships between a plurality of reference documents which are used for figuring out information about a main knowledge stream according to the embodiment of the present invention. The reference documents are identified by the numbers in circles. The numbers in the vertical line in the left hand represent the years when each of the reference documents was published, issued or written. For ease of explanation, an example of issuing year is described. For example, if it is assumed that the years are issuing years, the document 1 is issued in 1987. For ease of explanation, description will be given with reference to issuing years.

Arrows represent relationship between two reference documents. A document in a circle which an arrow reaches was referenced by another document, and a document in a circle from which an arrow originates references another document.

For example, it is shown that the document 15 issued in 1995 references the document 1 issued in 1987. As another example, the document 4610 issued in 2000 references the document 4157 issued in the same year. In this manner, reference relationships among a plurality of reference documents may be represented in chronological order. The more arrows reach a reference document, the more the reference document was referenced.

In the embodiment of the present invention, a database may store reference relationships among documents as shown in FIG. 4, or reference relationships as shown in FIG. 4 may be calculated from the information about reference relationship among documents. Further, a main knowledge stream may be calculated by using relationships of the document stored in the database.

Figure 5:
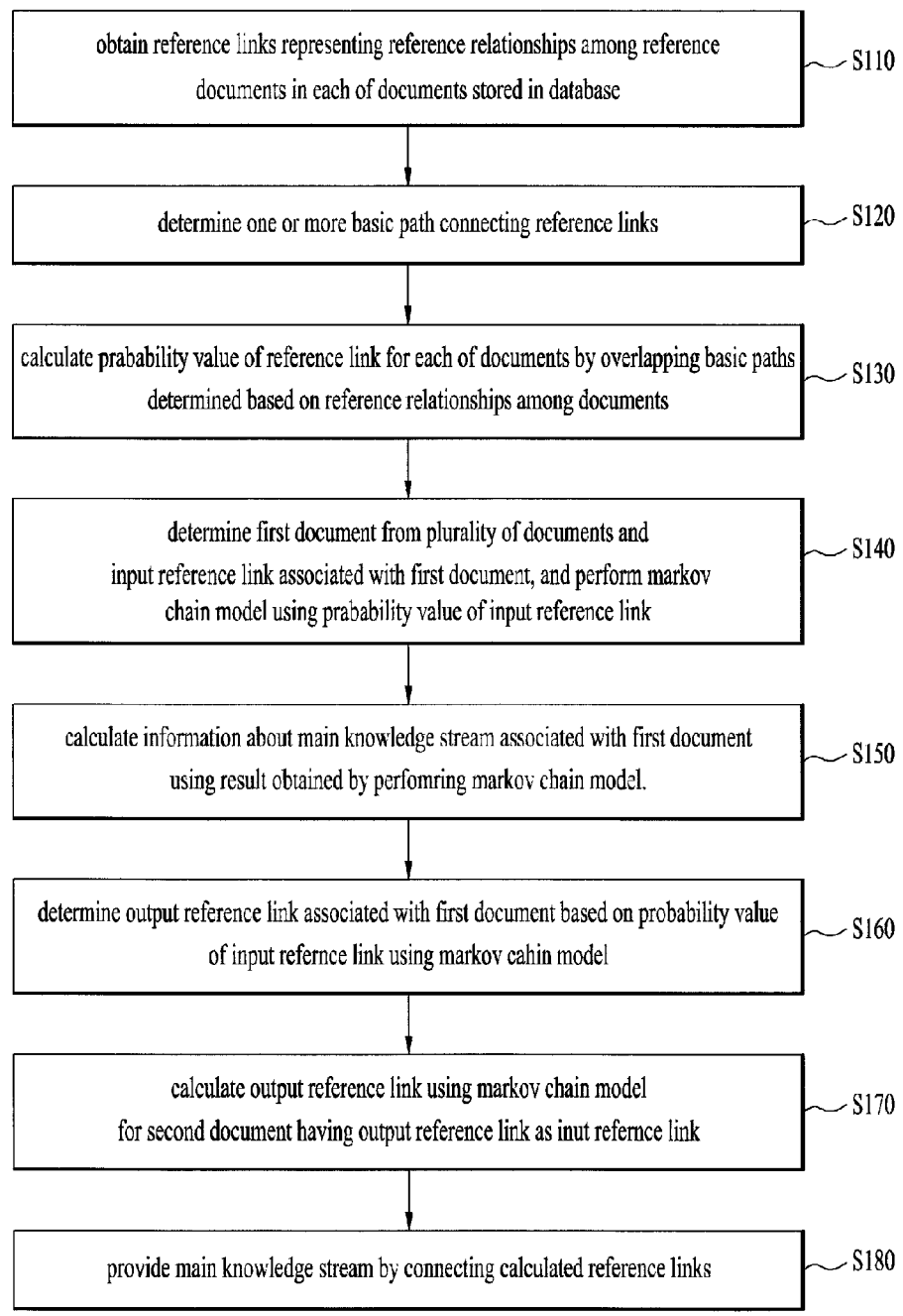
FIG. 5 is a flowchart illustrating a method for providing information about a main knowledge stream according to the embodiment of the present invention.

FIG. 5 is a flowchart illustrating a method of providing information about a main knowledge stream according to the embodiment of the present invention. The method will be described with reference to FIG. 5.

Reference links representing reference relationships among reference documents in each of the plurality of documents stored in the database are obtained (S110).

Then, one or more basic paths connecting the reference links is determined (S120).

That is, the one or more basic paths may be determined using the reference links among the reference documents in each of the stored documents.

Referring back to FIG. 2, a scheme for determining one or more basic paths among basic paths connecting the reference links is described.

In FIG. 2, reference links according to the reference relationships of the reference document in the document A is shown in the right side thereof. A basic path is determined based on the reference links among reference documents referenced in the document A. For example, in FIG. 2, the determined basic path from reference relationships among reference documents may be represented by solid lines. As an example, the longest path among paths connecting the reference links may be determined as the basic path determined from the reference links among reference documents for the certain document A.

Specifically, in the example of FIG. 2, several paths exist from the document 1 to the document 5 in a chronological order. In the example:

the first path may be the reference link from the document 1 to the document 5;

the second path may be the reference link from the document 1, the document 2, to the document 5; and the third path may be the reference link from the document 1, the document 2, the document 3, to the document 5.

In the above case in which several paths represent reference relationships between two documents, the third path, which is the longest, may be determined as the first basic path using the reference links of reference documents for the document A of determining a knowledge stream, and other reference links included in the other paths from the document 1 to document 5 may be deleted.

Further, in addition to the paths from the document 1 to the document 5, the path (the fourth path) from the document 4 to the document 5, the path (the fifth path) from the document 1, the document 2, the document 3, to the document 6 may be determined as the basic path using the reference links of the reference documents of the document A for determining the knowledge stream.

In short, for the certain document A, using the reference links representing the reference relationships among the reference documents in the certain document A, at least one of the paths from the oldest reference document (document 1) to the most recent reference document (document 5 or document 6) is marked as a basic path of the document A.

In a case that there are several paths reaching the same document (document 5) among the basic paths of the document A, the longest path among those may be determined as a basic path for determining a knowledge stream for the certain document A.

The longest path is determined as the basic path for the reason that, assuming information of all of the reference documents contributes to the knowledge stream, the longest path from the document 1 to the document 5 may be regarded as most appropriate since it is likely to have the most amount of information In a database storing information about N documents, using the reference links among the reference documents of each of the other document than the certain document A as described above, the respective basic path for each of the documents may be determined.

A probability value of the reference links may be calculated by overlapping the basic paths determined based on the reference links among the documents for each of the documents (S130). Alternatively, an accumulated value for the reference links may be calculated using the numbers of overlapped reference links of overlapped basic paths.

N documents stored in the database may be represented as the reference relationships connected by the reference links as shown in FIG. 4. In the reference relationships in FIG. 4, by overlapping the basic paths determined for each of the document through step S110, an accumulated value or a probability value for each of the reference links among the documents connected by the reference links as shown in FIG. 4 may be calculated.

The first document among the plurality of documents and an input reference link related to the first document are determined, and a Markov chain model is performed using a probability value of the input reference link (S140).

Using a result obtained by performing the Markov chain model, information about a main knowledge stream related to the first document is calculated (S150).

A path connecting reference links having the largest value among the accumulated values for a certain document may be determined as the main knowledge stream. Alternatively, the Markov chain model is performed using probability values of reference links input to the certain document, and the main knowledge stream may be determined by determining an output based on the result. Based on the probability values of the links input to each of the documents, which are nodes, an output reference link may be determined by performing the Markov chain model. Therefore, the main knowledge stream may be determined by connecting the outputs from the result.

The accumulated values may be regarded as weight values of the reference links, so that a document having the largest weight value may be determined as an output when determining an output from the certain document, i.e., a node.

Meanwhile, a Markov chain model statistically predicts transitions from one state to another with probabilities. Once an probability value of a reference link input to the certain document A is determined, a reference link output from the certain document A may be predicted with the probability value. Then, by connecting prediction values having high values, a path of knowledge streams may be determined.

For a document relating to several technical fields, a knowledge stream of a specific technical field may not be figured out solely by the reference links among the reference documents. However, since a reference link input to a document represents a stream of the specific technical field, once a reference link input to a document is determined, an output reference link from the document may be determined with probabilities.

By using a probability value of a reference link determined from the reference links among other reference documents in order to perform a Markov chain model, an output reference link may be determined based on the probability value of the reference link input to a document.

By using a Markov chain model, an output reference link related to the first document may be determined based on the probability value of the input reference link (S160). For the second document having the output reference link as an input reference link, an output reference link is calculated using the Markov chain model (S170).

The information about the main knowledge stream may be provided by connecting the calculated reference links (S180).

In the above, the input reference link represents the reference relationship with the third document referenced in the first document, while the output reference link represents the reference relationship that the second document reference the first document.

Figure 6:
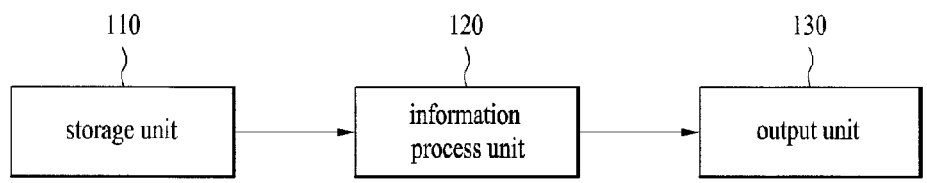
FIG. 6 is a block diagram for illustrating an apparatus for providing information about a main knowledge stream according to the embodiment of the present invention.

FIG. 6 illustrates an apparatus for providing information about a main knowledge stream according to the embodiment of the present invention. Referring to FIG. 6, the apparatus for providing information about a main knowledge stream according to the embodiment is described.

The apparatus according to the embodiment of the present invention may include a storage unit 110, an information process unit 120, and an output unit 130.

The storage unit 110 may be a database storing documents or information about the documents. The storage unit 110 may store updated or modified data if the information about the stored documents is updated or modified.

When the information process unit 120 performs an algorithm using the information about the stored documents, the storage unit 110 may store the result. For example, when the information process unit 120 determines reference relationships among the stored documents to be stored, the storage unit 110 may store data related to the reference relationships.

The information process unit 120 may express data stored in the storage unit 110 upon a user request, or may perform a calculation or an algorithm using data stored in the storage unit 110.

For example, the information process unit 120 may calculate reference relationships among documents using the information about the documents stored in the storage unit 110. The information process unit 120 may determine a basic path connecting reference links using the calculated reference relationships among the documents. The information process unit 120 may determine basic paths connecting reference links of reference documents in each of the documents, other than the certain document.

Accordingly, the information process unit 120 may calculate reference relationships among the documents using the information about the documents stored in the storage unit 110. The information process unit 120 may determine basic paths connecting reference links using the relationships among the calculated documents. The information process unit 120 may determine basic paths connecting reference links of the reference documents in each of documents, other than the certain document.

Accordingly, the information process unit 120 may determine accumulated values or probability values for reference links from the first link to the second link by accumulating basic paths determined for all of the documents.

Then, the information process unit 120 may obtain main knowledge streams of the documents stored in the storage unit 110 using the above accumulated values, and the output unit 130 may express the obtained main knowledge streams.

Further, the information process unit 120 may perform a Markov chain model using the probability values of the reference links calculated above. Accordingly, the information process unit 120 may determine main knowledge streams in a such manner that if an reference link input to a document is selected, an output reference link is determined using the probability value of the selected reference link.

The storage unit 110 may store a program configured to perform the steps illustrated in FIG. 5. Alternatively, the information process unit 120 may include a storage medium to store the program configured to perform the steps illustrated in FIG. 5.

The output unit 130 may express the information about the documents stored in the storage unit 110 when the storage unit 110 expresses the information, or the information process unit 120 causes the information stored in the storage unit 110 to be expressed. The information that the output unit 130 may express according to the embodiment of the present invention will be described below.

A user may search the output unit 130 for the information about the documents stored in the storage unit 110 and inquiry in a certain manner.

Figure 7:
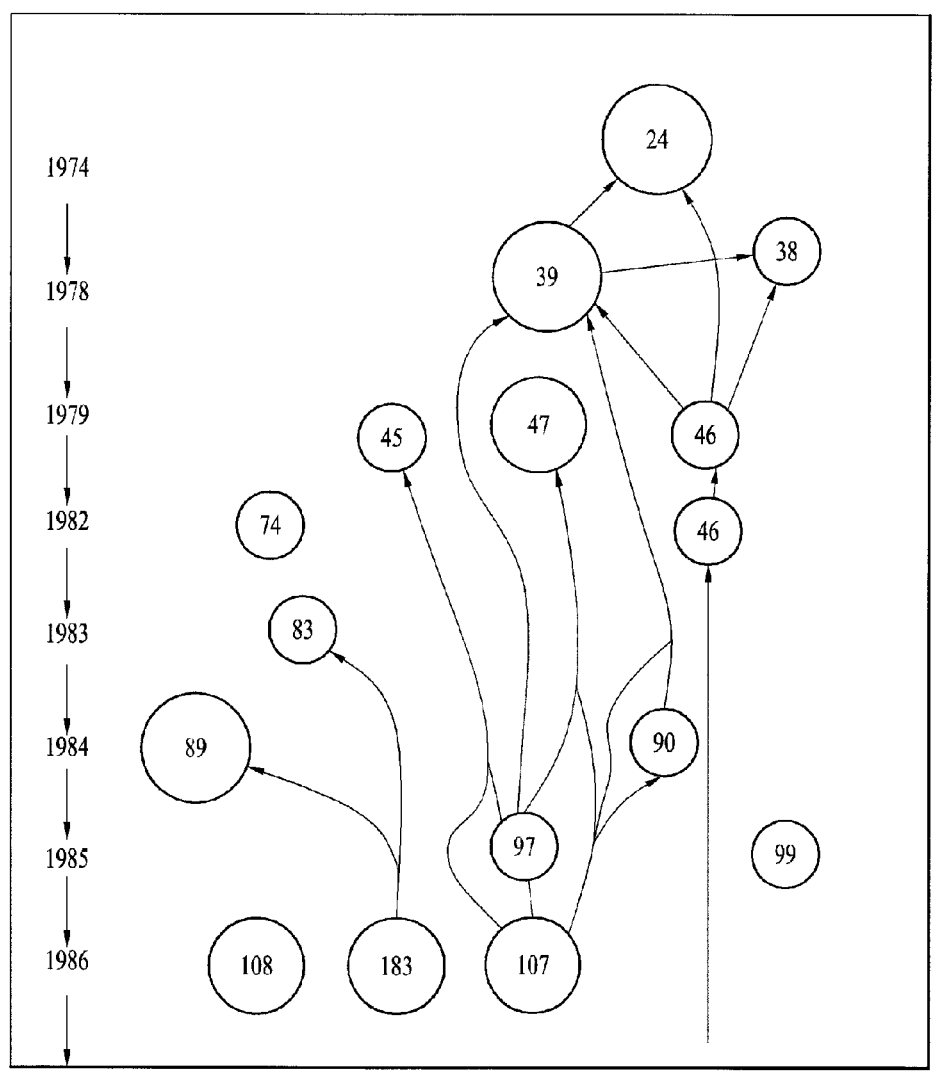
FIG. 7 is a view showing information expressed by an expression unit according to the embodiment of the present invention.

FIG. 7 shows an example of information expressed by the expression unit according to the embodiment of the present invention. When a user chooses a document of which a main knowledge stream is to be expressed and an input reference link from the determined basic paths of the document, the information process unit 120 may express a reference relationship as shown in FIG. 7. In the drawing, the numbers in the circles represent identifiers of documents, the numbers in the left column represent years, and the arrows connecting the circles represent main knowledge streams in reverse chronological order. Accordingly, if a user chooses a document or a document and a reference link input to the document, then main knowledge streams according to the present invention may be obtained.

Figure 8:
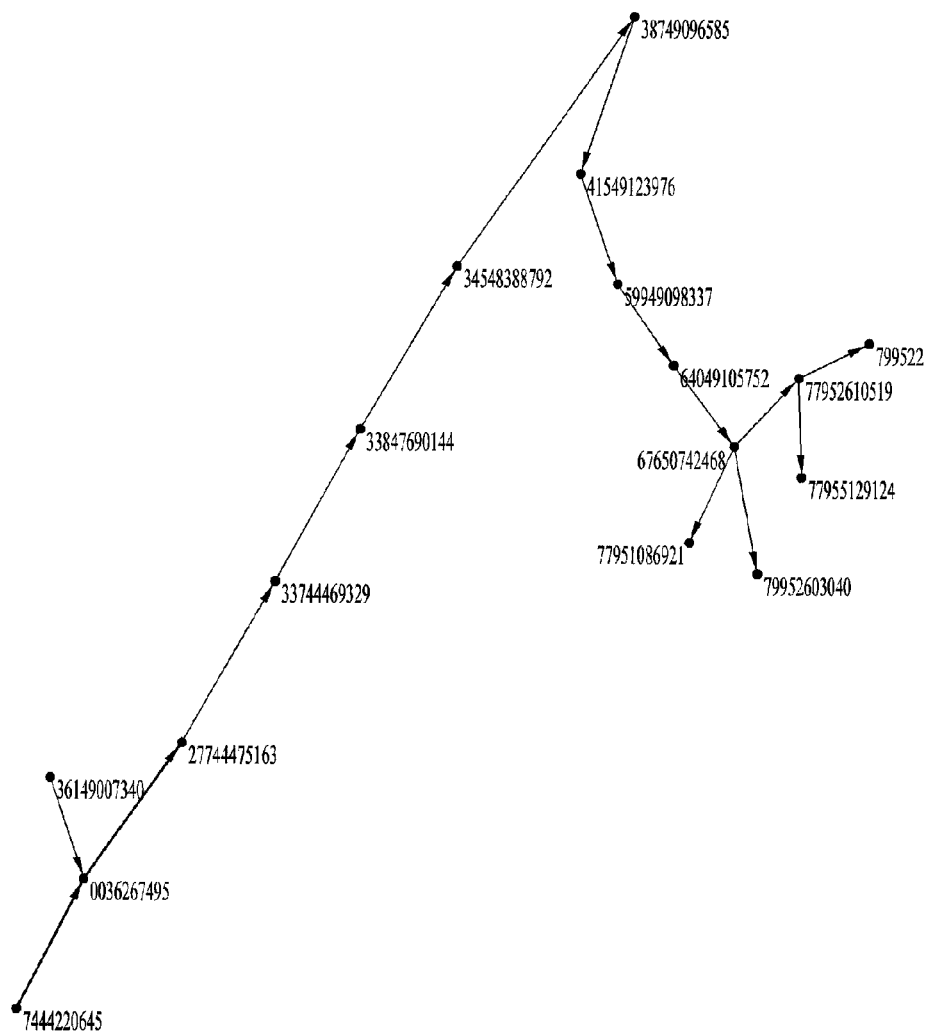
FIGS. 8 and 9 are views showing calculation results of main knowledge streams of a document in a specific technical field for evaluating the performance of the embodiment of the present invention.
Figure 9:
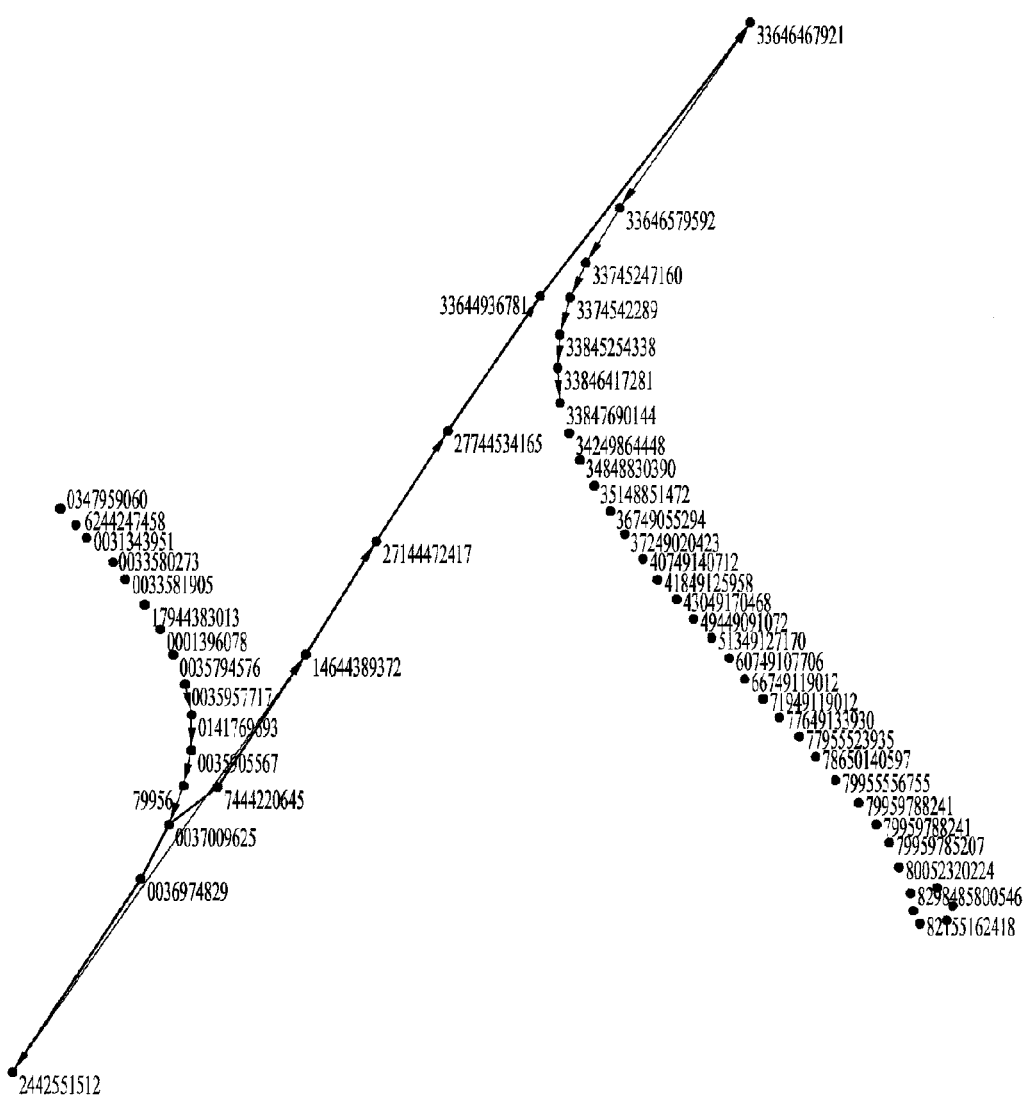

FIGS. 8 and 9 show calculation results of main knowledge streams for a document in a specific technical fields, for evaluating the performance of the embodiment of the present invention.

The field of graphene-based material relates to a material used in a semiconductor using a thin film of atomic thickness comprised of carbon atoms. The embodiment of the present invention is verified using 93,550 articles in the field. 2,397,488 reference relationships may be obtained from the 93,550 articles. The relationships shown in FIG. 8 may be obtained using an article among the articles and an input reference link of the article. The numbers represent identification numbers of documents, and lines or arrows connecting the points represent main knowledge streams in the field of graphene-based material.

On the other hand, FIG. 9 shows a main knowledge stream obtained according to a conventional technology. Compared to FIG. 8, it can be seen that there are too many documents expressed in the main knowledge streams so that it is complicated, and that the main knowledge stream in FIG. 9 is different from that of FIG. 8.

According to embodiments of the present invention, a main knowledge stream of a technical field may be calculated from reference relationships among documents and be expressed. Further, since a main knowledge stream calculated by embodiments of the present invention is determined based on an input reference link of a document, different main knowledge streams may be calculated depending on the technical field of the document associated with reference links. Further, a main knowledge stream may be easily figured out because the main knowledge stream is not complicated and only essential documents are expressed in embodiments of the present invention.

According to embodiments of the present invention, a main knowledge stream may be provided using reference relationships between documents and reference documents thereof. According to embodiments of present invention, a main knowledge stream may be more accurately provided depending on technical fields of documents, ways of solution, etc. According to embodiments of the present invention, knowledge streams of documents may be accurately estimated even if reference documents referenced by authors of the documents belong to different technical fields. According to embodiments of the present invention, it may be possible to figure out a main knowledge stream by exactly estimating a knowledge stream an author actually followed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for providing information about a main knowledge stream using an apparatus for providing the same, the method comprising:
   obtaining, at an information process module of the apparatus, reference links representing reference relationships among reference documents for each of a plurality of documents stored in a database;
   defining, at the information process module, one or more paths connecting the reference links for each of the plurality of documents;
   determining, at the information process module, a longest path among the defined paths as a basic path for each of the plurality of documents;
   calculating, at the information process module, probability values of the reference links by overlapping the determined basic paths;
   determining, at the information process module, a first document from among the documents and an input reference link for the first document, and performing at the information process module, a Markov chain model using a probability value of the input reference link; and
   calculating, at the information process module, the information about the main knowledge stream for the first document using a result obtained by performing the Markov chain model.

2. The method according to claim 1, wherein the calculating comprises determining, at the information process module, an output reference link for the first document based on the probability value of the input reference link using the Markov chain model.

3. The method according to claim 2, further comprising:
   calculating, at the information process module, an output reference link using the Markov chain model for a second document, which has the output reference link for the first document as an input reference link; and
   connecting, at the information process module, the calculated reference links to provide the information about the main knowledge stream.

4. The method according to claim 1, wherein the input reference link for the first document represents a reference relationship with a third document which is referenced by the first document.

5. The method according to claim 1, wherein the output reference link for the first document represents a reference relationship with the second document which references the first document.

6. A method for providing information about a main knowledge stream using apparatus for providing the same, the method comprising:
   obtaining, at an information process module of the apparatus, reference links representing reference relationships among reference documents for each of a plurality of documents stored in a database;
   defining, at the information process module, one or more paths connecting the reference links for each of the plurality of documents;
   determining, at the information process module, a longest path among the defined paths as a basic path for each of the plurality of documents;
   calculating, at the information process module, accumulated values of the reference links by overlapping the determined basic paths;
   calculating, at the information process module, the information about the main knowledge stream for a first document using the first document among the documents and the accumulated values of the reference link for the first document.

7. An apparatus for providing information about a main knowledge stream, the apparatus comprising:
   a storage module for storing information about a plurality of documents;
   an information process module for obtaining reference links representing reference relationships among reference documents for each of the documents from information about the documents stored in the storage module, defining one or more paths connecting the reference links for each of the plurality of documents, determining a longest path among the defined paths as a basic path for each of the plurality of documents, calculating probability values of the reference links by overlapping the determined basic paths, determining a first document from among the documents and an input reference link for the first document, performing a Markov chain model using a probability value of the input reference link, and calculating the information about the main knowledge stream for the first document using a result obtained by performing the Markov chain model; and
   an output module for providing the information about the main knowledge stream for the first document calculated by the information process module.

8. The apparatus according to claim 7, wherein the information process module determines an output reference link for the first document based on the probability value of the input reference link using the Markov chain model, calculates an output reference link using the Markov chain model for a second document, which has the output reference link for the first document as an input reference link, and connects the calculated reference links to provide the information about the main knowledge stream.

9. The method according to claim 1, wherein the defining paths comprises defining, at the information process module, paths from an oldest reference document to a most recent reference document.

10. The method according to claim 6, wherein the defining paths comprises defining, at the information process module, paths from an oldest reference document to a most recent reference document.

11. The apparatus according to claim 7, wherein the information process module defines the paths connecting the reference links by defining paths from an oldest reference document to a most recent reference document.

12. The apparatus according to claim 7, wherein the information process module comprises a microprocessor for a computer.

13. The apparatus according to claim 7, wherein the storage module comprises a non-transitory computer-readable storage medium.

* * * * *